May 16, 1933. F. BRUNNER 1,909,454
FILLING DEVICE FOR PASTY MATTER
Filed Jan. 7, 1932 2 Sheets-Sheet 1
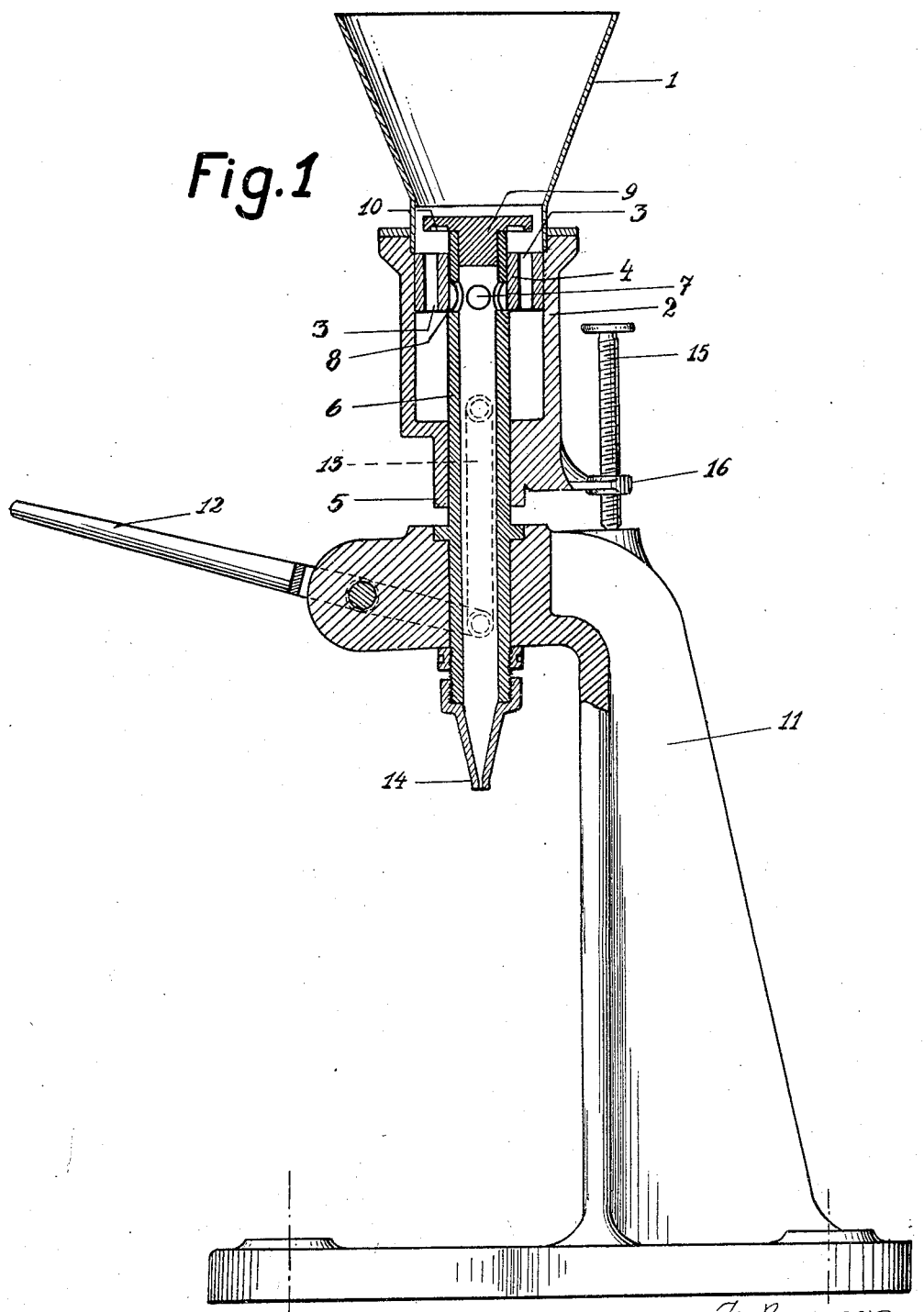

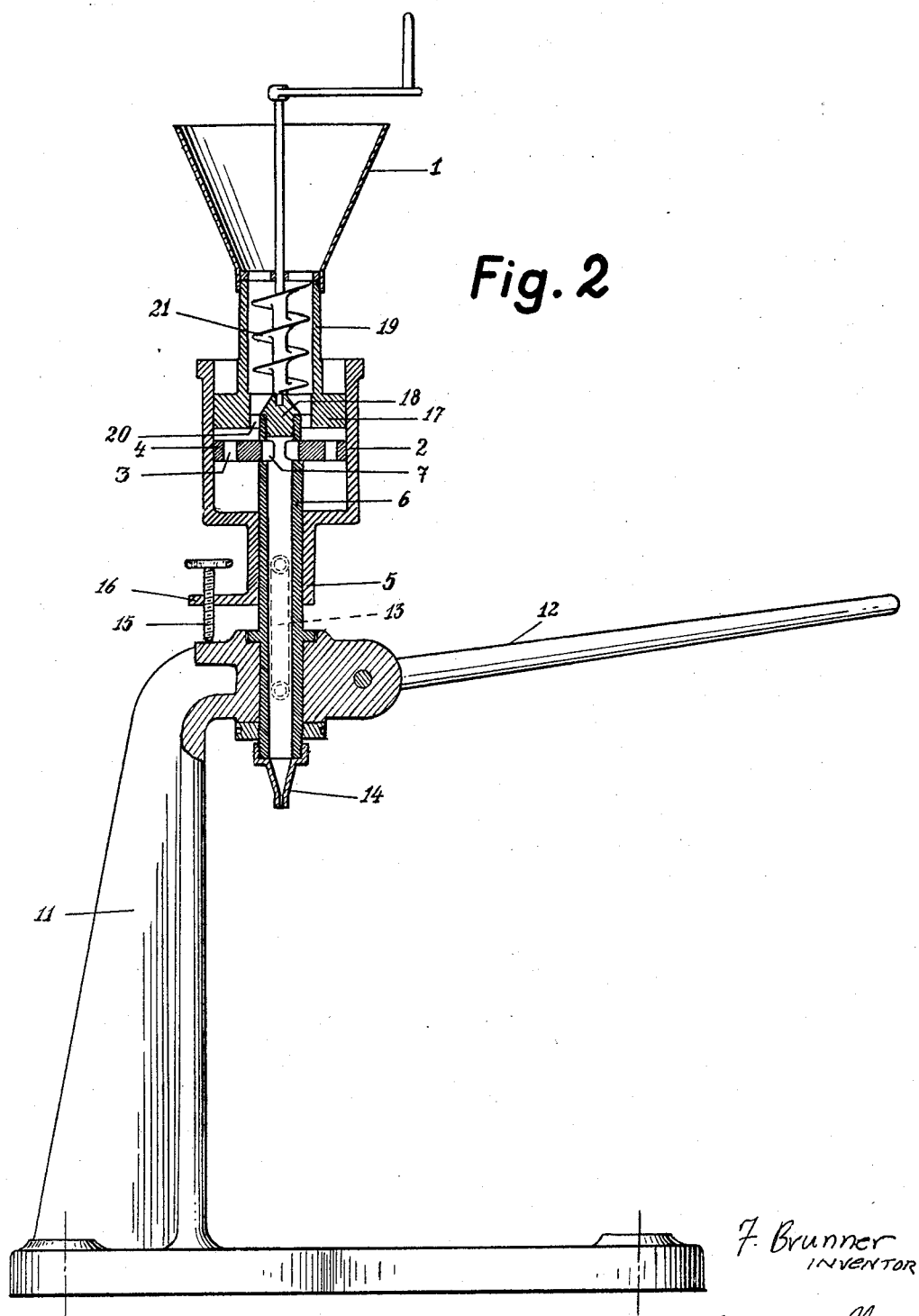

UNITED STATES PATENT OFFICE

FELIX BRUNNER, OF MODLING, NEAR VIENNA, AUSTRIA

FILLING DEVICE FOR PASTY MATTER

Application filed January 7, 1932, Serial No. 585,310, and in Germany March 30, 1931.

This invention relates to a filling device for use with pasty substances such as are generally required to be filled in equal quantities into tubes or other similar containers. The device provided by the invention can, however, equally well be employed for the delivery of soft soap and the like in quantities destined for occasional, i. e. not constantly repeated, use.

In accordance with the invention the device consists essentially of a perforated plunger guided in a receptacle adapted to serve as the cylinder of a pump, and of a tubular plunger rod adapted to serve for the moving of the said plunger and to slide in the latter, this plunger rod being provided with two stops adapted to engage the plunger and to carry the same along with them in their movement. The one stop is extended flange-shaped, and also serves, during the movement of the plunger to seal or close over the perforations in the latter, while the plunger, by its movement, and according to its position relative to the plunger rod, closes or uncovers the exit openings for the pasty substance used. These exit openings can be suitably provided in the tubular plunger rod, so that the exuded paste or soap can be conveniently received into the empty tube fitted over the orifice or into the hollow of the hand. The hollow plunger rod is preferably arranged to be stationary, while the cylinder of the pump, which constitutes the measuring vessel, is movable, since this arrangement makes it unnecessary to provide springs or the like for the returning of the device, that is to say its moving parts, into the position of rest. The supply container can be connected to the pump cylinder, and can thus be made to participate in the movement of the latter, the shaking up of the supply container thus effected being advantageous for the repeated filling of the pump cylinder at each operation of the device. The supply container can, however, equally well be attached to the plunger rod, thus being stationary, and can be arranged to contain stirring means.

Two possible forms of construction embodying the invention are shown, by way of example, in section, in the two figures of the accompanying drawing, to which reference should be had.

There is rigidly connected to a supply container or hopper 1 a cylindrical receptacle 2 in which the ring-shaped plunger 4, having perforations 3, is adapted to slide. The receptacle 2 is shouldered in at its lower end to form a tubular portion 5 of smaller cross-section in which latter the tubular plunger rod 6 is slidably mounted. The plunger rod can, if desired, be packed by means of jointing material, a stuffing-box, or the like. The plunger rod 6 is provided near the end of its tubular portion with apertures 7 for the escape of the pasty substance, while it is shouldered in as to its outer diameter, and is adapted to slide with this reduced portion in the ring-shaped plunger 4. The transition from the portion of larger diameter to the portion of smaller diameter forms the stop 8 which effects the movement of the plunger 4 on the operation of the device. The hollow plunger rod 6 is closed at its inner end by a plug 9 having a flange 10 which closes the perforations 3 during the ascending movement of the receptacle 2. For the moving up and down of the receptacle 2 there is provided a lever 12 which is mounted on the upright 11, and which is connected to the outer casing of the device by means of the link 13. A mouthpiece adapted to the purpose in view, e. g. a nozzle 14, is fitted to the end of the hollow plunger rod 6. A stop 16, which is adjustable by means of screw 15, serves to limit the stroke, and thus to determine and regulate the amount of matter expressed by the device at each operation.

In the form of construction shown in Fig. 2 the plug 9 used in the form shown in Fig. 1 is replaced by a piston-like piece 17 which can slide in the cylinder 2, and which is connected by its plug 18 to the plunger rod. The piston 17 possesses a tubular extension 19 and apertures 20 which permit of the passage of the material to be filled from the hopper 1 to the pump cylinder 2. Stirring means are denoted by the reference number 21.

The mode of operation of the device is as follows:—

If the container together with the cylinder 2 be lifted by depression of the lever 12, the plunger 4 will first likewise be moved upwards by friction, and will thus uncover the openings 7 and thereby establish communication between the hollow space in the plunger rod 6 and the interior of the cylinder 2 which in its turn is closed in the direction of the hopper 1 as soon as the plunger 4 comes up against the flange 10 (Fig. 1) or piston 17 (Fig. 2) which closes the apertures 3. By the further upward movement of the cylinder 2, its contents are pressed by the now closed plunger 4 through the openings 7 and out through the hollow plunger rod 6. During the downward movement of the cylinder 2 the apertures 3 are first uncovered, and communication thus established between the cylinder 2 and the hopper 1, the openings 7 in the hollow plunger rod being at the same time closed. During its further downward movement the plunger 4 bears against the shoulder 8 on the plunger rod, and material is thus sucked from the hopper 1 towards the cylinder 2, the stop 16 limiting the length of the stroke and thereby the quality of material sucked in.

I claim:—

1. A filling device for pasty substances, more particularly for filling tubes and the like, a cylinder adapted to serve as a measuring vessel, a perforated ring-shaped plunger adapted to travel in the said cylinder, perforations in the said plunger, a tubular plunger rod adapted to slide in the said plunger and to effect the movement of the same, openings in the wall of the said tubular plunger rod, two stops on the said rod adapted to engage the said plunger, one of the said stops being in the form of a flange and adapted to close the said perforations in the said plunger, and the other of the said stops being a shoulder on the said plunger rod.

2. A filling device for pasty matter comprising a cylinder adapted to serve as a measuring vessel, a ring-shaped plunger adapted to travel in the said cylinder, perforations in the said plunger, a tubular plunger rod adapted to slide in and to effect the movement of the said plunger, openings in the wall of the said rod, two stops on the said rod adapted to engage the said plunger, a tubular extension on the said rod, and a hopper on the said extension, the said rod being adapted to close the said perforations in the plunger, while the said plunger is adapted to serve as a seal for the said openings in the wall of the tubular plunger rod.

3. In a filling device as claimed in claim 1 an adjustable stop adapted to regulate the length of the stroke of the said cylinder relative to the said plunger, for the purpose of enabling the quantity of pasty matter expressed at each stroke to be regulated at will.

4. In a filling device as claimed in claim 2 an adjustable stop adapted to regulate the length of the stroke of the said cylinder relative to the said plunger, for the purpose of enabling the quantity of pasty matter expressed at each stroke to be regulated at will.

In testimony whereof I affix my signature.

FELIX BRUNNER.